US010764964B2

(12) United States Patent
Harrison et al.

(10) Patent No.: US 10,764,964 B2
(45) Date of Patent: Sep. 1, 2020

(54) CONICAL HEATER ASSEMBLY FOR A GAS CHROMATOGRAPHY COLUMN

(71) Applicant: Agilent Technologies, Inc., Santa Clara, CA (US)

(72) Inventors: Thomas Harrison, Philadelphia, PA (US); Sammye Elizabeth Traudt, Middletown, DE (US); William H Wilson, Newark, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 419 days.

(21) Appl. No.: 14/877,729

(22) Filed: Oct. 7, 2015

(65) Prior Publication Data

US 2017/0105247 A1 Apr. 13, 2017

(51) Int. Cl.
  *G01N 30/00* (2006.01)
  *H05B 1/02* (2006.01)
  *G01N 30/30* (2006.01)
  *G01N 30/60* (2006.01)
  *H05B 3/48* (2006.01)
  (Continued)

(52) U.S. Cl.
  CPC ........... *H05B 1/0247* (2013.01); *G01N 30/30* (2013.01); *G01N 30/60* (2013.01); *H05B 3/48* (2013.01); *G01N 30/54* (2013.01); *G01N 30/6052* (2013.01); *G01N 2030/025* (2013.01); *G01N 2030/3053* (2013.01)

(58) Field of Classification Search
  CPC .... G01N 30/30; G01N 30/60; G01N 30/6052; G01N 2030/3053; G01N 2030/025
  See application file for complete search history.

(56) References Cited

U.S. PATENT DOCUMENTS 3,213,596 A  10/1965  Gill
3,290,482 A  12/1966  Dodd et al.
(Continued)

FOREIGN PATENT DOCUMENTS

CN  201034990 Y  3/2008
CN  101498698 A  8/2009
(Continued)

OTHER PUBLICATIONS

YouTube video titled "Agilent GC Column Installation Video GC Troubleshotting Series" by 24yogeshk published on Aug. 12, 2013 and available at https://www.youtube.com/watch?v=wWnYIS0z5RQ.*
(Continued)

*Primary Examiner* — Blake A Tankersley (57) ABSTRACT

A heating apparatus for a gas chromatography column is described. The GC column heating apparatus includes a conical heater assembly comprising a heating element between an inner layer and an outer layer. The apparatus can also include optionally an outer cowl and/or an inner cowl surrounding the conical heater assembly. The conical heater assembly rapidly increases the temperature of the column by conductive heating. The selection of shape (in particular, the cone angle of a conical heater) and materials allows the GC column to adapt to expansion that occurs upon heating. A gas chromatography (GC) column heating and cooling apparatus is also described, in which the heater and outer cowl define a flowpath through which a cooling fluid can pass and cool the GC column.

17 Claims, 5 Drawing Sheets

(51) Int. Cl.
 *G01N 30/54* (2006.01)
 *G01N 30/02* (2006.01)

(56) References Cited

U.S. PATENT DOCUMENTS

| | | | |
|---|---|---|---|
| 4,096,908 A | 6/1978 | Lamy | |
| 4,193,963 A | 3/1980 | Bruening et al. | |
| 4,351,385 A | 9/1982 | Amey | |
| 4,854,952 A * | 8/1989 | Stepien | G01N 30/30 126/273 R |
| 5,005,399 A | 4/1991 | Holtzclaw et al. | |
| 5,014,541 A | 5/1991 | Sides et al. | |
| 5,437,179 A * | 8/1995 | Wiegand | G01N 30/30 73/23.35 |
| 5,552,042 A | 9/1996 | Le Febre et al. | |
| 5,808,178 A | 9/1998 | Rounbehler et al. | |
| 5,856,616 A | 1/1999 | Maswadeh et al. | |
| 6,029,498 A | 2/2000 | Walters et al. | |
| 6,093,921 A | 7/2000 | Gaisford et al. | |
| 6,530,260 B1 | 3/2003 | Mustacich et al. | |
| 2005/0100479 A1 | 5/2005 | White et al. | |
| 2006/0283324 A1 * | 12/2006 | Roques | G01N 30/6095 96/101 |
| 2008/0148814 A1 * | 6/2008 | Bostrom | E21B 49/00 73/23.35 |
| 2010/0189897 A1 | 7/2010 | Braun et al. | |
| 2014/0131570 A1 | 5/2014 | Yoshioka et al. | |
| 2016/0007652 A1 * | 1/2016 | Taluskie | A24F 47/008 131/328 |

FOREIGN PATENT DOCUMENTS

| | | |
|---|---|---|
| CN | 201903535 U | 7/2011 |
| CN | 104122351 A | 10/2014 |
| CN | 204330700 U | 5/2015 |
| DE | 102014004286 B3 | 4/2015 |
| EP | 0410341 A2 | 1/1991 |
| GB | 1232119 A | 5/1971 |
| JP | S5288271 A | 7/1997 |
| SU | 828073 A1 | 5/1981 |

OTHER PUBLICATIONS

A. Wang, et al., Gas chromatography using resistive heating technology, Journal of Chromatography A, May 14, 2012, vol. 1261, 46-57.

A. T. James, et al., A Compact Radiochemical Gas Chromatograph, Journal of Analytical Chemistry, Apr. 1963, vol. 35, No. 4, pp. 515-520.

Search Report dated Jul. 31, 2017 for German Patent Application No. 102016219384.8, filed on Oct. 6, 2016.

* cited by examiner

CONICAL HEATER ASSEMBLY FOR A GAS CHROMATOGRAPHY COLUMN

CROSS-REFERENCE TO RELATED APPLICATIONS

None.

BACKGROUND

In gas chromatography (GC) systems, the amount of time required for a chemical compound to traverse the entire length of a separation column ("column") is known as its retention time. One factor that contributes to the retention time of a chemical compound is the temperature of the separation column. Controlling the temperature of the column precisely from analysis to analysis is beneficial to provide repeatability in the retention time for a particular chemical compound or analyte. In addition, programmatically changing the column temperature while the sample components are migrating through it can advantageously provide shorter analysis time and reduce peak broadening.

Often, columns are heated in known systems using an air convection oven because of its ability to provide a uniform and repeatable thermal environment in a space large enough to accommodate a wide variety of column diameters and lengths. The columns are typically arranged on a support structure such as a basket that creates an open cylinder of column coils, with open space inside and outside the cylinder. This allows the heated air access over all the column surfaces and results in uniform temperatures across the entire column length. While air convection ovens are useful, their use comes with clear disadvantages. For example, convection ovens require a significant amount of energy and time to heat up, and a significant amount of time to cool down. This leads, of course, to comparatively long cycle times and high power consumption, among other disadvantages. In addition, the ability to do rapid analysis via temperature programmed conditions is limited when using air convection ovens.

Conduction or "resistive" based technologies have been actively researched for the promise of faster heating and cooling rates but adoption has been slow because design tradeoffs have often forced the technology to be optimized for only certain niche markets. Low Thermal Mass (LTM) column modules are available in which the fused silica capillary column is bundled together with a heater element and temperature sensor. The result of bundling the heater, sensor and column together is the most direct transfer of heat, resulting in programming rates as fast as approximately 1800° C./min using under 200 W of power. However, the analytical results are not as repeatable as when an air bath oven is used. Also, the disadvantage of bundling the column with its heater and sensor is that a customer must replace the heater and sensor with the column (e.g., when the column is fouled or broken, the heater must also be replaced). In addition, bundled columns are liable to have reduced lifetime due to their construction and the concentration of stresses on the column tubing.

What is needed, therefore, is an apparatus that overcomes at least the drawbacks of known GC column heaters.

SUMMARY OF THE INVENTION

In accordance with a representative embodiment, a heating apparatus for a gas chromatography column comprises a conical heater assembly comprising a heating element between an inner layer and an outer layer.

In accordance with another representative embodiment, a gas chromatography apparatus comprises a conical heater assembly comprising a heating element between an inner layer and an outer layer. The apparatus also comprises a gas chromatography (GC) column arranged around the outer layer of the conical heater assembly, wherein the column is in direct or indirect contact with the outer layer of the heater, or a gas chromatography (GC) column arranged on the inner layer of the conical heater assembly, wherein the column is in direct or indirect contact with the inner layer of the conical heater assembly.

In the foregoing embodiments, the apparatus can also comprise a first interior layer disposed between the heating element and the inner layer, or a second interior layer disposed between the heating element and the outer layer, or both first interior layer disposed between the heating element and the inner layer, and a second interior layer disposed between the heating element and the outer layer. In some embodiments, the apparatus can also comprise an outer cowl surrounding the outer layer of the conical heater assembly, wherein the outer cowl is arranged to provide a first flowpath between the outer layer of the conical heater assembly and the outer cowl. In some embodiments, the apparatus further comprises an inner cowl that is surrounded by and arranged to provide a second flowpath between the inner layer of the conical heater assembly and the inner cowl.

In the foregoing embodiments, the apparatus further comprises a cooling system, wherein the first flowpath between the outer cowl and the heater assembly is fluidly connected with the cooling system, and/or the second flowpath between the inner cowl and the heater assembly is fluidly connected with the cooling system. The cooling system can comprise a fan or pressurized gas, and the cooling system can be configured to blow cooling gas over the conical heater assembly.

In some embodiments of the gas chromatography apparatus, the GC column and the conical heater assembly are adapted for the GC column to move along the conical heater assembly in response to differing thermal expansions of the conical heater assembly and the GC column. In some embodiments, the outer layer of the conical heater assembly comprises one or more of metal, metal alloys, silica, quartz, diamond, silicon carbide, boron nitride, aluminum nitride, or alumina, and the GC column comprises fused silica, glass, or metal.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DEFINED TERMINOLOGY

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art considers the cancellation to be acceptable.

As used in the specification and the appended claims and in addition to its ordinary meaning, the term "approximately" means to within an acceptable limit or amount to one having ordinary skill in the art. For example, 'approximately the same' means that one of ordinary skill in the art considers the items being compared to be the same.

Relative terms, such as "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, will now be "below" that element. Similarly, if the device were rotated by 90° with respect to the view in the drawings, an element described "above" or "below" another element will now be "adjacent" to the other element; where "adjacent" means either abutting the other element, or having one or more layers, materials, structures, etc., between the elements.

As used herein, the term "conical" means an object having the shape of a cone or a cylinder that tapers in diameter from a first end to a second end. A conical object may have, but does not require, a pointed end, and so "conical" includes the term "frustoconical". In other words, a conical object may be a solid or hollow cone with its pointed top cut off or absent. The term frustoconical means an object has the shape of a frustum of a cone. The sides of a cylindrical or conical object may be straight, curved or partially straight and partially curved.

DETAILED DESCRIPTION

In the following detailed description, for purposes of explanation and not limitation, representative embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the representative embodiments.

The present apparatus overcomes many drawbacks associated with prior GC column heaters. In certain embodiments, the present apparatus achieves one or more of the objectives of rapid heating; rapid cooling; adaptability for different column diameters and lengths; low risk of column damage or breakage; separation of the heater from the column during column replacement or service; and low energy consumption. For example, embodiments of the present apparatus allow for the use of a much wider range of column diameters and lengths while still achieving the benefits of conduction-based heating. In addition, embodiments of the present apparatus allow long lengths of various internal diameter columns to be used and still have the benefit of lower power consumption, faster temperature programming rates, and faster cooling times than a traditional air bath oven. They do this while also allowing the column to remain separable from the heater.

Figure 1:
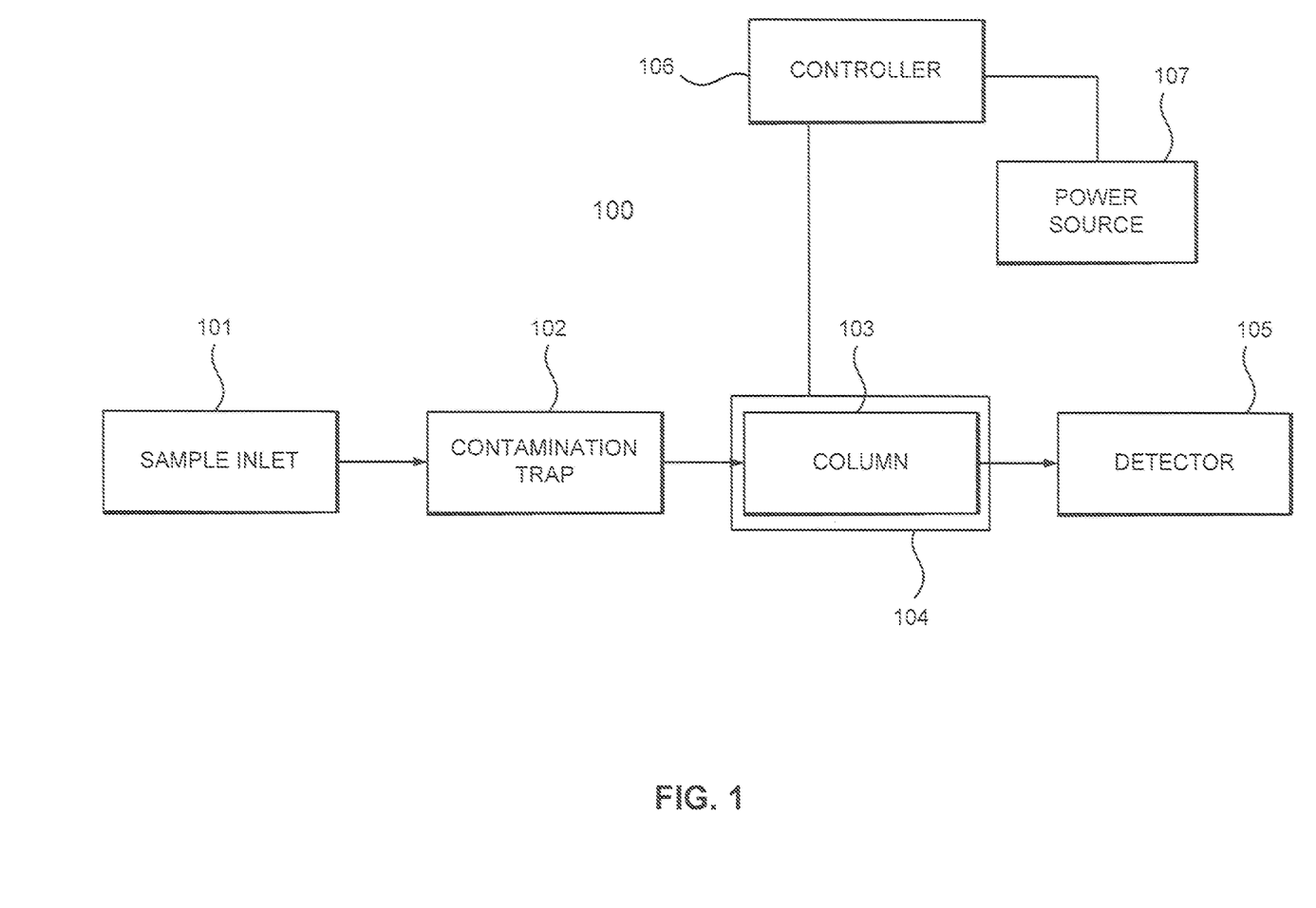
FIG. 1 is a simplified block diagram of a GC system in accordance with a representative embodiment.

FIG. 1 is a simplified block diagram of a GC system 100 in accordance with a representative embodiment. Many aspects of GC systems 100 are known in the field, so details of certain known components of the GC system 100 are omitted. In certain instances representative examples of known components that can be implemented are noted, but are presented for illustration and are, in no way, intended to be limiting.

The GC system 100 comprises a sample inlet 101. The sample inlet 101 is fluidly coupled to a contaminant trap 102. The contaminant trap 102 is fluidically coupled to a column 103, which can be one of a variety of columns useful in gas chromatography. In an embodiment, the contaminant trap 102 is as described in U.S. Patent Application Publication No. 20150107332, the disclosure of which is specifically incorporated herein by reference. It is noted that the inclusion of contaminant trap 102 is merely illustrative, and the present teachings are contemplated for use in GC systems that do not comprise a contaminant trap, or that do not comprise a microfluidic contaminant trap as described in the application referenced above. The contaminant trap 102 is a microfluidic contaminant trap configured to trap contaminants in the sample from the sample inlet 101 and to prevent the trapped contaminants from reaching the column 103.

The column 103 separates the components of a chemical sample. The column 103 can be a capillary column comprising a piece of fused silica or metal tubing or other material (not shown in FIG. 1) with a coating on the inner portions of the tubing or packed with particles that interact with the sample from sample inlet 101 to separate the components of the chemical sample.

The column 103 is provided in contact with a column temperature control apparatus 104. By virtue of the column temperature control apparatus 104, the retention times of the chemical components are controlled, while the uniformity of the heating of the column 103 is comparatively improved. Furthermore, in certain embodiments, the column 103 can be cooled in a comparatively thorough manner, ultimately improving repeatability of the retention time of an analyte and analysis cycle time compared to known GC systems. These and other benefits of the column temperature control apparatus 104 are described more fully below in connection with representative embodiments.

The column 103 is connected to a detector 105, which detects the presence and frequently the quantity of the components separated by the column 103. Generally, the detector 105 is a known GC detector such as a flame ionization detector (FID), a mass spectrometer detector (MSD), a thermal conductivity detector (TCD), an electron capture detector (ECD), a nitrogen phosphorus detector (NPD), a sulfur chemiluminescence detector (SCD), a nitrogen chemiluminescence detector (NCD), a pulsed flame photometric detector (PFPD), a helium ionization detector (HID), or a flame photometric detector (FPD).

The GC system 100 also comprises a controller 106 and a power source 107. The controller 106 can be one of a plurality of controllers (not shown) of the GC system 100, or can be the sole controller of the GC system. Presently, the function of the controller 106 with respect to maintaining the heating of the column 103 by the column temperature control apparatus 104 is described. Other functions of the controller 106 or of other controllers are not germane to the present teachings and are not described.

Generally, the controller 106 can be implemented in numerous ways (e.g., such as with dedicated hardware) to perform various functions discussed herein. A "processor" is one example of a controller, which employs one or more microprocessors that are programmed using software (e.g., microcode) to perform various functions discussed herein. The controller 106 can be implemented with or without employing a processor, and also can be implemented as a combination of dedicated hardware to perform some functions and a processor (e.g., one or more programmed microprocessors and associated circuitry) to perform other functions. Examples of controller components that can be employed in various embodiments of the present disclosure include, but are not limited to, conventional microprocessors, microcontrollers, application specific integrated circuits (ASICs), and field-programmable gate arrays (FPGAs).

In various implementations, the controller 106 is associated with one or more storage media (generically referred to herein as "memory," e.g., volatile and non-volatile computer memory such as random-access memory (RAM), read-only memory (ROM), programmable read-only memory (PROM), electrically programmable read-only memory (EPROM), electrically erasable and programmable read only memory (EEPROM), universal serial bus (USB) drive, floppy disks, compact disks, optical disks, magnetic tape, etc.). In some implementations, the storage media can be encoded with one or more programs that, when executed on the controller 106, perform at least some of the functions discussed herein. Various storage media can be fixed within the controller 106 or can be transportable, such that the one or more programs stored thereon can be loaded into a processor or controller so as to implement various aspects of the present teachings discussed herein. The terms "program" or "computer program" are used herein in a generic sense to refer to any type of computer code (e.g., software or microcode) that can be employed to program the controller 106.

The controller 106 is configured to receive temperature data from a temperature sensor (not shown in FIG. 1), and based on the temperature data, is configured to provide control signals to the power source 107. The power source 107 is one of a number of known electrical power sources and is configured to adjust the power of the column temperature control apparatus 104 to maintain the temperature of the column 103 at approximately a desired temperature.

Figure 2A:
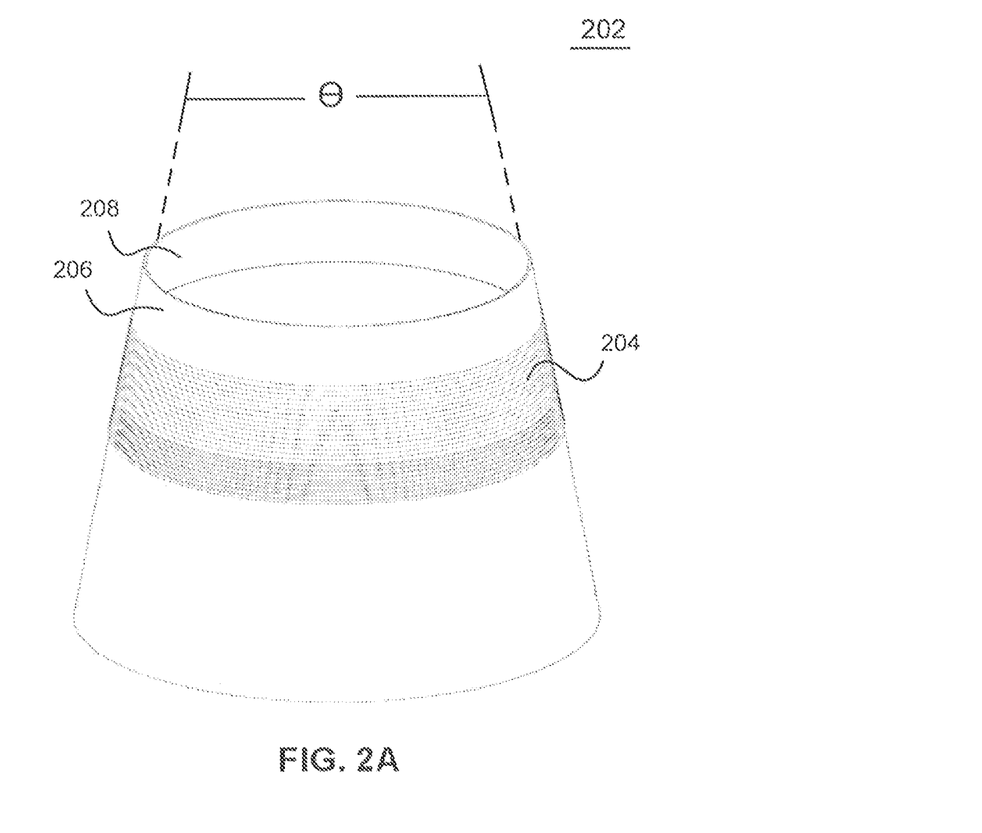
FIG. 2A illustrates a GC column wound around a conical heater assembly in accordance with a representative embodiment.
Figure 2B:
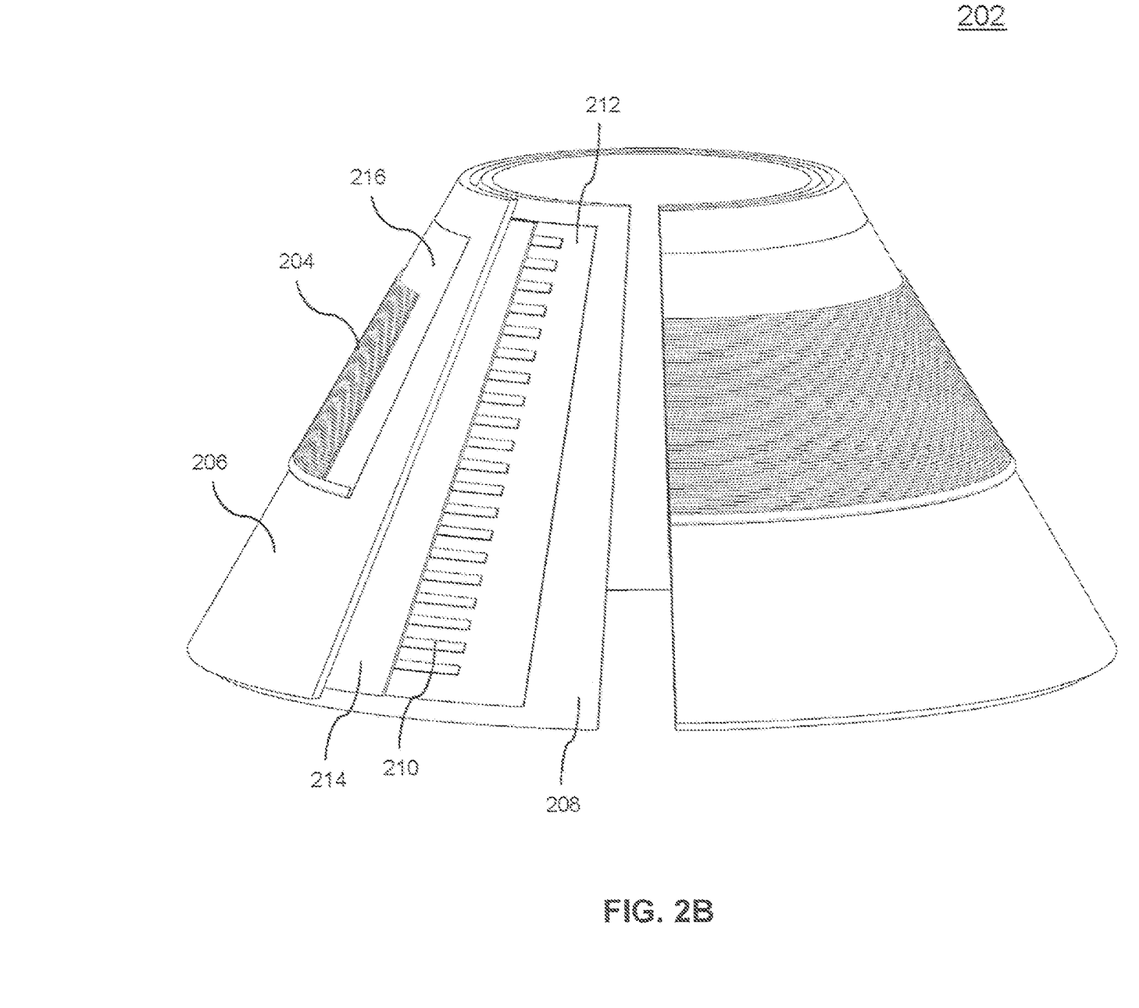
FIG. 2B illustrates a cut-away view of another embodiment of a conical heater assembly with a GC column in a column holder.

FIGS. 2A to 2D illustrate aspects of the present apparatus for heating a GC column and certain parameters for the design of the apparatus. FIG. 2A shows a heater assembly 202 having a conical shape and a hollow or open interior. The conical heating assembly 202 for heating a GC column 204 at least comprises an outer layer 206 and an inner layer 208, with a heating element 210 (shown in FIG. 2B) between the layers 206, 208. The heater assembly 202 can be conical, for example frustoconical. For illustrative purposes, a GC column 204 is shown coiled around an outer surface of an outer layer 206 of the heater assembly 202, so that a desired length of the column is in direct contact with the outer surface of the outer layer 206 of the heater assembly 202. Alternatively, a GC column can indirectly contact the heater assembly, such as when the column is wound on a column holder 216 or sheath (as shown in FIG. 2B) and the resulting column assembly is placed on the heater assembly. It should be noted, however, that the conical heater assembly 202 can be made or provided without the GC column 204. The heater assembly or the column holder on which the column is wound can have a protrusion, indentation or marking to indicate a place where the GC column can be wound around the heater assembly or sheath. The heater assembly 202 is sized so that the GC column 204 can be coiled around the outer surface of the outer layer 206 a desired number of times so that a desired length of column contacts the heater assembly. It is also contemplated that the column can be placed on the inner surface of the inner layer 208 of the conical heater assembly 202.

The conical heater assembly 202 can be operated to provide heat to the GC column 204 by conduction and potentially by radiation; as the temperature of the heater is raised, heat is conductively and radiatively transferred to the column 204. As discussed in more detail below, the heater assembly 202 and the column 204 can comprise different materials. For example, in some embodiments, as shown in FIG. 2B, the heater assembly 202 has interior layers 212, 214 of mica and an outer layer 206 and an inner layer 208 of stainless steel, and the column 204 is comprised of fused silica or glass. In some embodiments, other metals or metal alloys can be used for the outer layer.

FIG. 2B shows a cut-away view of a heater assembly 202, a GC column 204, and a column holder 216. The heater assembly 202 comprises a resistive heating element 210 of electrical traces generally shaped as a cone. The resistive heating element 210 is surrounded by an inner layer 208 and an outer layer 206. The inner layer 208 surrounds the heating element 210 on the inner diameter of the cone. The outer layer 206 surrounds the heating element 210 on the outer diameter of the cone. If the column is wound on the inside of the heater assembly, the column is in direct or indirect contact with the inner layer 208. If the column is wound around the outside of the heater assembly, the column is in direct or indirect contact with the outer layer 206. An optional first interior layer 212 can be placed between the heating element 210 and the inner layer 208. Reasons for having a first interior layer 212 include, but are not limited to, for electrical insulation when the inner layer 208 is electrically conductive across the temperature range at which the heater operates, for better physical conformance between the heating element and the inner layer, for structural purposes, and/or for the ability to provide a layer in which to embed a temperature sensor. Similarly, a second interior layer 214 is optionally placed between the heating element and the outer layer 206 for any one or more of the above reasons or for additional reasons. In some embodiments, the column 204 may be wrapped onto a column holder 216. The column holder 216 can serve as a structural element to maintain the column's shape and allow easy installation and removal.

The heater assembly 202 and the column 204 may be constructed from materials with different coefficients of thermal expansion (CTEs), meaning that their dimensions will change at a different rate as their temperatures rise. In order to have even and repeatable thermal transfer between the column and the heater assembly, the column remains coiled tightly against the heater assembly across the applicable temperature range. This can be accommodated with a heater of conical rather than cylindrical shape. The coefficient of thermal expansion (CTE) of a GC column can be very different than the coefficient of thermal expansion of the heater assembly. For example, in one embodiment, the GC column can be made out of fused silica, which has a CTE of ~0.5 ppm/K. The heater assembly can have a different coefficient of thermal expansion that is either higher or lower than the CTE for the column. For example, typical metals have a CTE in the range of ~10 to ~30 ppm/K. If the heater assembly has a CTE that is larger than that of the column, when the heater assembly temperature is raised, its outer layer will "grow" or expand radially. While the fused silica column will also grow or expand, it will do so to a much lesser extent. If the column is wound on the outer surface of the outer layer 206 of the heater assembly and the heater assembly is cylindrical rather than conical in shape, the stress induced due to the difference in thermal expansion between the column and heater assembly can result in column breakage, especially for a column of fused silica or glass. If the heater is soft enough, the column might coin itself into the heater, damaging the heater. Alternatively, if the column is wound on the inside of the heater, the heater expands away from the column when its temperature was raised resulting in a loss of physical contact between the heater and the column. This loss of contact will reduce heat transfer and chromatographic performance. If the CTE of the heater assembly is smaller than that of the column the opposite scenarios occurs. The present disclosure addresses the challenges posed by differing material CTEs in several ways, including having a heater with a conical shape and choosing the correct materials with which to construct the heater assembly.

In the heater assembly of conical shape described herein, if stresses arise due to a substantial difference between the heater assembly CTE and the column CTE (such as more than 15 ppm/K), the column (typically with a smaller CTE) is able to slide along the angled surface of the heater, moving toward the end of the cone having the smaller diameter, thereby relieving the stresses and avoiding breakage of the column or separation of the column from the heater. If the column CTE is larger than the CTE of the heater assembly, the column grows more than the heater assembly and moves towards the larger diameter end of the cone as heating occurs.

Figure 2C:
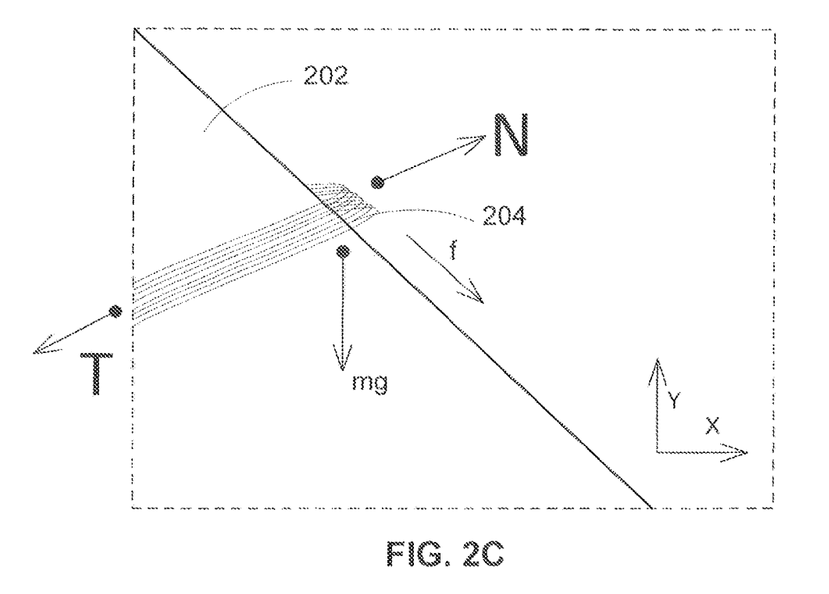
FIG. 2C shows a portion of a conical heater assembly with a GC column would around it, including relevant parameters to account for the coefficients of thermal expansion.
Figure 2D:
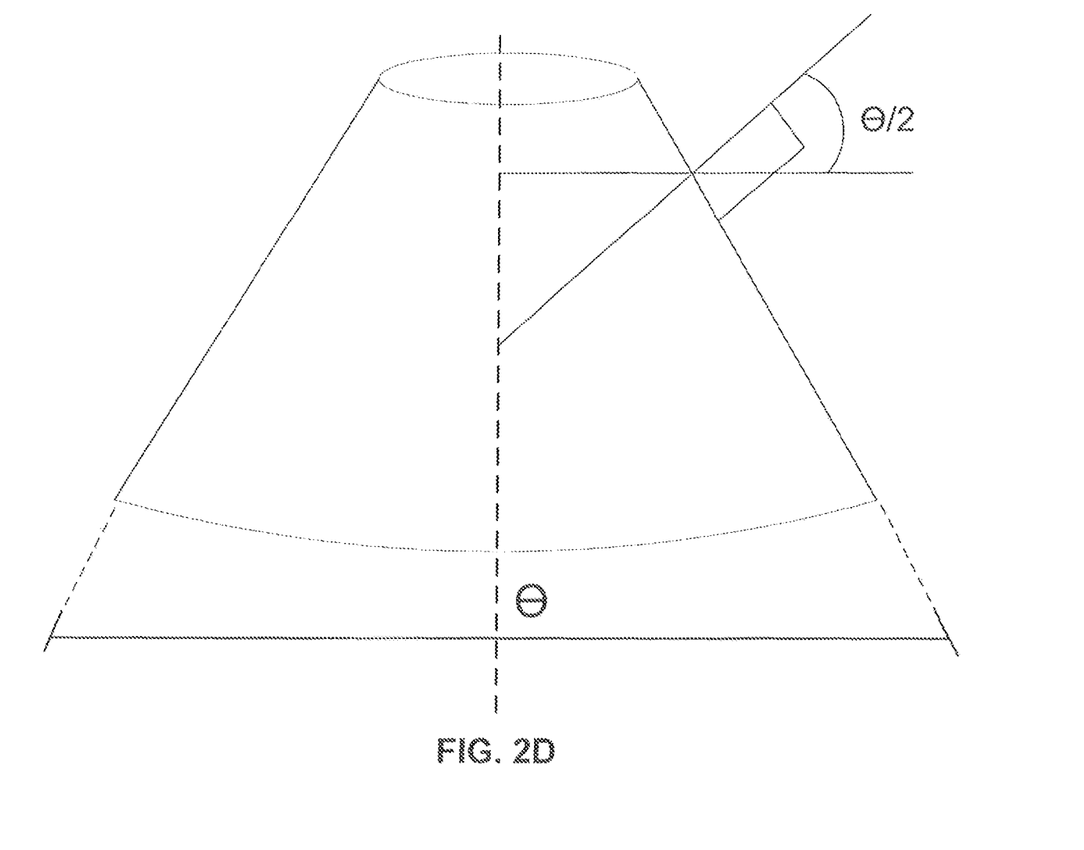
FIG. 2D shows a cone angle θ for an embodiment of a conical heater assembly.

In FIGS. 2A, 2C and 2D, θ represents the cone angle of the heater assembly 202. FIG. 2C illustrates the external forces on a GC column 204 as it is heated by a heater assembly 202. The forces acting at the contact of the GC column 204 and heater assembly include a normal force from the heater (N) and a force due to gravity (mass×g). In the Figures, various forces are shown directionally by arrows, but those arrows are not intended to indicate the forces are localized at the arrows. The gravity component of the forces changes direction depending on the orientation of the heater as described below.

FIG. 2C shows a portion of a conical heater assembly with a GC column would around it, including relevant parameters to account for the coefficients of thermal expansion. The forces on each differential radial element of the column are a normal force from the heater assembly (N); a tensile force from the radial element of the column (T); gravitational force acting vertically on the column (mg); frictional forces (f) resisting movement of the column over the heater. μ represents the coefficient of friction that exists for any two given materials used for the inner or outer layer of the heater assembly (whichever is in direct contact with the column) and the column.

The sum of horizontal forces ($F_x$) at static equilibrium can be represented by the following formula:

$$\Sigma F_x = T_x - f_x - N_x \quad (1)$$

Where $T_x$, $f_x$, and $N_x$ are the components of the tensile, frictional, and normal force in the x-direction. At equilibrium, the sum of forces is zero since the column is not moving and is not heated. The horizontal frictional force and horizontal normal force can be expressed in terms of the cone angle θ, which yields the following formula:

$$\Sigma F_x = T_x - \mu N \sin(\theta/2) - N\cos(\theta/2) \quad (2)$$

The sum of vertical forces ($F_y$) on the column at static equilibrium can be represented by the following formula:

$$\Sigma F_y = -T_y - \text{mg} - f_y + N_y \quad (3)$$

Where $T_y$, $f_y$, and $N_y$ are the components of the tensile, frictional, and normal force in the y-direction (for example, a vertical direction). At equilibrium, the sum of vertical forces is zero. The vertical frictional force and vertical normal force can also be expressed in terms of the cone angle θ, which yields the following formula:

$$\Sigma F_y = N\sin(\theta/2) - \text{mg} - T_y - \mu N(\cos\theta/2) \quad (4)$$

When adding heat, the sum of forces will change. If $CTE_{Heater} > CTE_{column}$, the heater will expand radially to a greater degree than the column. The conical shape of the heater can relieve stresses arising from CTE mismatch, especially when the following condition is met and maintained during the heating and cooling:

$$N\sin(\theta/2) > \text{mg} + T_y + \mu N\cos(\theta/2) \quad (5)$$

Additionally, in the present apparatus, the tensile stress is below the level which breaks or damage the column, and the normal force is lower than the level which causes the column to coin into the heater assembly. In designing the heater assembly and column, μ can be sufficiently small by choosing an appropriate material for the inner or outer layer (depending on which is in contact with the column), and θ can be sufficiently large. Thus the present disclosure enables one to design and build a frustoconical GC column heater from different materials, including materials where there is a substantial difference in CTE between the heater assembly and the GC column. A designer can adjust μ and θ to arrive at a suitable design. In certain embodiments, the apparatus has an operational temperature range (for example, −60° C.

to 450° C.), and N sin(θ/2) is greater than (mg+$T_y$+μN cos(θ/2) when the apparatus is at rest, preferably throughout the temperature range. Exemplary cone angles include from greater than 0° to less than 180°; alternatively from 45° to 160°. The minimum cone angle required to allow the column to slide without damage is dependent upon the coefficient of friction.

FIG. 2D provides an illustration of the cone angle θ for an embodiment of a conical heater assembly, as well as the value (θ/2).

In some embodiments, a preferred orientation of the heater assembly (for example, a substantial vertical orientation as illustrated in FIG. 2A) will be selected along with preferred materials for the heater assembly and the GC column, so as to obtain desired sums of forces ($\Sigma F_x$ and $\Sigma F_y$) or ranges of sums under operating conditions. In other orientations of the heater assembly where gravity is not the restorative force on the column (e.g., if the heater has a substantially horizontal orientation, as if the heater assembly in FIG. 2A were rotated 90 or 180°), the heater assembly comprises springs or other tension devices to maintain contact between the column and the heater assembly.

As will be appreciated by one of ordinary skill in the art, the "thermal mass" of an object is a measure of its capacity to store thermal energy (heat). As such, a material that has a comparatively low thermal mass will require less energy in order to change temperature than one of comparatively high thermal mass. As described more fully below, in order to enable faster heating and cooling, the materials selected for the heater assembly have a comparatively low thermal mass.

The selection of material for the heater is additionally informed by mechanical stiffness, low thermal gradients, and resistance to thermal deformation. These parameters are important in determining the minimum thickness of the heater. Along with thermal mass, these are not independent characteristics, so choice of materials is made based on some or all of them. The ultimate goal is to achieve low thermal gradients across the heater assembly while achieving a relatively low thermal mass heater assembly to enable faster heating and cooling.

Thermal gradients across the heater surface may result because the heating element (such as a foil or wire) may not have a completely homogenous thermal profile. Gradients are reduced when the material chosen for the inner or outer layer of the heater assembly (whichever is in contact with the column) has low resistance to heat flow, that is, a high thermal conductivity, k. It is desirable, therefore, to have a material with comparatively high thermal conductivity, so that the outer or inner surface of the heater assembly that touches the GC column is substantially uniform in temperature.

Large thermal gradients across the heater surface can also reduce the structural integrity of the heater as portions of the heater layers grow at different rates than other portions. The stresses induced can cause buckling in the heater assembly, particularly if the layers are very thin. The extent of differential thermal expansion can be reduced or minimized by choosing a material for the heater layers with a high thermal conductivity, a low coefficient of thermal expansion, or both. A material with high thermal conductivity resists the formation of large thermal gradients within the material. Materials with low thermal expansion do not grow very much even under significant thermal gradients. Choosing materials with a high thermal conductivity, low thermal expansion coefficient, or both, for the inner or outer layers allows for the use of less material (e.g., a thinner layer or coating of it) and therefore less thermal mass while maintaining structural integrity. It is also important to select a material for the heater assembly that maintains sufficient mechanical and thermal properties at operating temperatures, for example up to approximately 450° C. or higher.

A consideration in the selection of the material for the outer and inner layers of the heater assembly is the electrical insulative properties of the material. Beneficially, the material is substantially electrically insulating to avoid having to add an optional first and second layer between the heating element and the outer and inner layers. Otherwise, if the inner layer is not electrically insulating, an electrically insulating first layer is disposed between the inner layer and the heating element to prevent current from being transferred between the traces of the heating element and the inner layer. Similarly, if the outer layer is not electrically insulating, an electrically insulating second layer is disposed between the outer layer and the heating element to prevent current from being transferred between the heating element and the outer layer.

Illustrative materials that can be used for the outer layer or the inner layer or both include one or more of metals, metal alloys, silicon, quartz, diamond, silicon carbide, boron nitride, aluminum nitride, or alumina. Metals, including but not limited to stainless steel alloys, nickel alloys, clad copper alloys, aluminum alloys, etc., can also be used for the inner and outer layers, but a first and second layer can be included for electrical isolation from the heating element. A layer can be made from a solid sheet of material or it can be particles of the material in a medium such as an adhesive. The inner and outer layers can be formed by applying a coating of material to the heating element, and then curing or solidifying the coating, so that the first and second interior layers form a unitary coating that encases the heating element. For example, the coating can comprise mica particles in a binder or an adhesive, such as Ceramabond 632 Mica Adhesive.

A preferred embodiment of the heater assembly 202 comprises a heating element 210 sandwiched between first interior layer 212 and second interior layer 214, both comprised of a suitable material, e.g., mica. The first interior layer 212 and second interior layer 214 are then covered with inner layer 208 and outer layer 206. The interior layers of the suitable material can have a thickness of, for example, 75 to 125 microns. Between the interior layers is the heating element. The heating element can be very thin and can have a thickness, for example, of approximately 50 microns. The heating element has leads for connection to a voltage source such as line voltage. When the GC column is located on the outer surface, the first layer of suitable material, e.g., mica, can be relatively thick compared to the second layer of suitable material, e.g., mica, in order to direct heat outwardly to the GC column but not too thick as to require large cooldown times. The outer layer 206 and inner layer 208 can be comprised of metal or other materials to give structural integrity to the heater assembly and survive the range of potential column temperatures (e.g. −60° to 450° C.). Stainless steel can be used for the outer and inner layers. These layers are kept as thin as possible to maintain low overall thermal mass while still providing sufficient lifetime structural integrity. Exemplary thicknesses for the inner and outer layers are from 100 microns to 1 millimeter, but are not limited to this range.

A suitable material for the interior layers, e.g., mica, provides good thermal conductivity and dielectric strength. For example, mica is stable when exposed to electricity, light, moisture, and extreme temperatures. It has good electrical properties as an insulator. A layer of suitable material, e.g., mica, has sufficient electrical insulation to prevent a heating element from shorting out against a metallic GC column, the inner or outer layers of the heater assembly, or between the traces of the heating element itself. In the heating elements of the present apparatus, an electrical current is passed through a heating element, such heating elements, in general, being well known. Circuits are also known which control the temperature of the heating element in response to a heat sensing element, which measures the temperature of the heating element or a heat transfer member in intimate contact with the heating element. In general, such systems compare the desired temperature of the heating element (which is usually externally set by an operator) with the temperature measured by the heat sensing element. The current through the heating element is then turned on and off in response to the measured temperature being greater or less than the desired temperature, respectively. In this manner, the heating element is substantially maintaining an equilibrium temperature corresponding to the desired temperature as the heating element loses heat to its surroundings and gains heat from the electrical current.

The heating element is made from a material that produces heat when an electric current passes through. The material used for the heating element can be a pure metal or a metal alloy. For example, the heating element can comprise a material selected from the group consisting of nickel, chromium, iron, steel, copper, tantalum, tungsten, molybdenum, platinum, rhenium, hafnium, and alloys thereof. By way of further example, the material of the heating element can be made of nichrome, nickel-chromium, nickel-chromium-iron, nickel-chromium-aluminum alloy, stainless steel, silicon carbide, molybdenum disilicide, graphite, or any resistive material known for heating element design. Exemplary resistive materials can be a Ni—Cr or nicrome wire, Fe—Cr wire, or SUS wire. The shape of the heating element can be a coil, foil, flat plate, printed paste (sintered metal), mesh, ribbon or sheet. In a representative embodiment, the heating element has a pattern that minimizes the thickness of the heater, such as a foil.

Temperature sensors can be positioned in contact with or near the heater assembly to detect the temperature of the heater assembly. Heater assembly temperature can be maintained by controlling the power supplied to the heating element. In addition to a target temperature value, a controller can receive additional parameters used to calculate a power requirement of the heating element. The heater assembly temperature sensor can be in addition to the heat sensing element which measures the temperature of the heating element, and they can provide separate inputs to the control. Alternatively, the heater assembly temperature sensor can be used instead of the heat sensing element.

In certain embodiments, an intermediate sheath or column holder is disposed between the heater assembly and the column. For example, the column holder 216 is substantially the same shape as the heater assembly (e.g., it has the same cone angle as the heater) with a slightly larger diameter so that it can fit on and around the outer surface of the heater, making close physical contact so that heat is conductively transferred with little or no loss. The column holder 216 will have a height that is at least the height of the column winding around the heater and sheath. The column holder 216 protects the heater from coining or other damage by the column. In some embodiments, the column holder 216 is removed with the column when the column is replaced. In some embodiments, a GC column is fixedly attached to the column holder 216.

Figure 3:
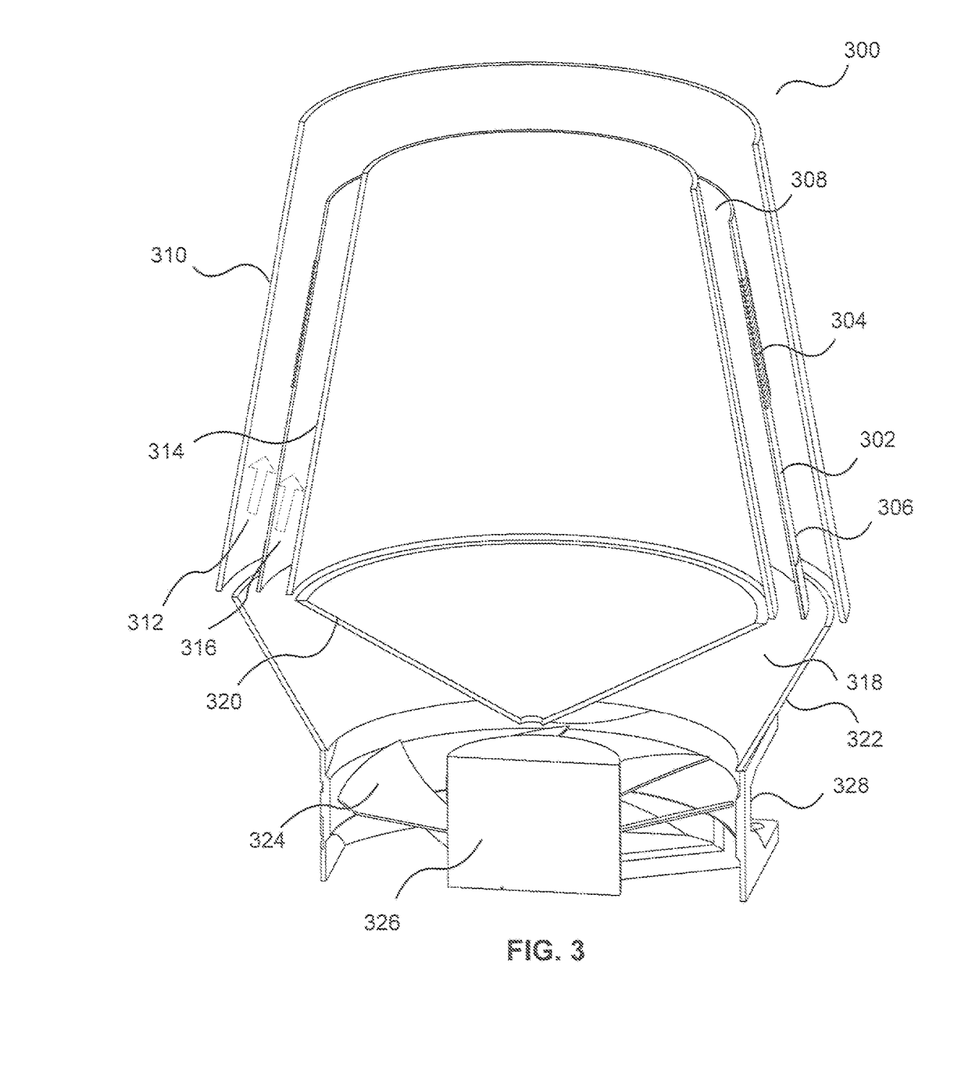
FIG. 3 is a partial cutaway view showing the interior of an apparatus for heating and cooling a GC column in accordance with a representative embodiment.

FIG. 3 shows an isometric partial cutaway view of an apparatus for heating and cooling a GC column. The apparatus includes a heating apparatus for a gas chromatography column 300, with a conical heating assembly which can have the design shown in FIG. 2B, or another design. In the embodiment shown, the heater assembly 302 has a GC column 304 coiled around a portion of its outer layer 306 (alternatively the column is wound on the inner layer 308 of the heater assembly 302). For illustrative purposes, a GC column 304 is shown coiled around an outer surface of an outer layer 306 of the heater assembly 302, but it should be noted, however, that the conical heater assembly 302 can be made or provided without the GC column 304. The column heating apparatus is substantially uniformly and rapidly heats the GC column contacting the heater assembly 302. An outer cowl 310 is disposed around the outer layer 306 and together 310 and 306 define a first flow path 312. An inner cowl 314 is disposed facing the inner layer 308 of the conical heater assembly 302 and together 314 and 308 define a second flow path 316. Both the outer and inner cowl can be made of a variety of materials as long as the material can withstand the residual heat emitted from the heater assembly. Flowpaths 312 and 316 have first ends which open to or are fluidly connected to a cooling system, which can comprise a fan or pressurized gas. For example, in FIG. 3, flowpaths 312 and 316 have ends opening to a manifold 318 defined by an inner shell 320 and an outer shell 322. The manifold contains cooling gas such as air. The apparatus can include a fan 324 (or multiple fans) situated for blowing cooling air from the manifold 318 into and through the flow paths 312, 316 during a cooling phase for the GC column (for example, after an analysis has been completed using the GC column). Thus, the cooling system can be configured to blow cooling gas over the conical heater assembly. While the fan or fans can be configured to blow air over the column heating apparatus, they can also be configured to pull air over the column heater assembly 302. Although FIG. 3 shows the fan at the wider end of the conical heater assembly, in some embodiments, the fan is at the narrower end of the cone. The column heating apparatus substantially uniformly and rapidly cools the GC column contacting the heater assembly 302.

Relative to an air bath oven, the present apparatus provides significant gains in heating rate, as much as an order of magnitude or more. For example, some conventional GC column heating systems (such as the Agilent 7890A Gas Chromatograph) have a maximum heating rate of 30° C./min up to 450° C., whereas the present apparatus can achieve a maximum heating rate of 300° C./min while consuming less power. Furthermore, due to the reduction in thermal mass, cool-down of the GC column is also faster. Whereas a conventional GC column heating system might take six or seven minutes to cool-down, the present apparatus might do so in one to two minutes.

Relative to other designs of low thermal mass GC column heating apparatus, the present apparatus separates the heater from the column, providing several advantages. (1) the heater can be calibrated once and independently from the column; (2) the cost associated with replacing the heater is not embedded in the cost of each column; (3) the heater can be used with columns of different lengths, radii and materials.

As alluded to above, the controller 106 receives temperature data from the temperature sensor and/or heat sensing element, and based on these data provides control signals to the power source 107. Based on the control signals from the controller 106, the power source 107 adjusts electrical power to the heater assembly 202 to maintain the temperature of the GC column at a substantially constant value or to cause it to change according to some desired program.

The column heating apparatus can include a means to secure the various components of the column heating apparatus. Means of securing the cowls and heater assembly are contemplated, such as brackets, clips, welding, etc. The requirements of the securing means are that it can withstand the elevated temperatures (e.g., 450° C.) and still maintain sufficient pressure on the column heating apparatus. High temperature metals are the preferred material. Gravity will hold the column against the heater assembly if positioned in the orientation implied by FIG. 2B. If the heater assembly is in a different orientation, for example, 90 degrees or 180 degrees from the orientation shown in FIG. 2B, a spring or other device can be used to help the column maintain contact with the heater.

In a representative embodiment, the GC column comprises a fused silica capillary column. The dimensions of the GC column vary, but typical inside diameters range from approximately 25 µm to approximately 530 µm. The present apparatus can be used with GC columns of all diameters, including those in the range of 25 to 530 µm. Typical lengths range from approximately 5 meters to approximately 60 meters. The coiling of GC column in representative embodiments can be tightly coiled wherein the coils are "stacked" so that each coil of the GC column can make good contact with the other coils and the outer surface of the heater, which is substantially conical, as described above.

Illustratively, the GC column 204 has a length up to approximately 60 m with an inner diameter of 320 µm (or smaller internal diameter) and comprises a fused silica capillary column. In some embodiments, the GC column can have a length of from about 1 m to about 105 m, alternatively from about 5 m to about 75 m, alternatively from about 5 m to about 60 m, alternatively from about 10 m to about 75 m, alternatively from about 30 m to about 75 m, alternatively from about 30 m to about 60 m. Alternatively, the GC column can have an inner diameter of 25 to 530 µm. The column can be metal, fused silica or another material, and the column typically has an interior coating or surface and can also be packed with a stationary phase.

In operation, after the GC column 204 is provided on the outer surface of the heater assembly, the heating element is activated and begins to increase in temperature and to heat the coils of the column. The heating of the GC column 204 is substantially uniform and efficient due to the various characteristics of the components of the apparatus as discussed above. After a specific run is completed, the GC column 204 and the heating assembly are cooled to its initial temperature for the analysis. Because of the various components of the column heating apparatus as discussed above, the heating assembly cools comparatively quickly to its initial temperature and does not substantially retain heat from the previous run. As such, when the next analysis is started, the heating assembly and the GC column are at substantially the same initial temperature from the previous run. Moreover, the cycle time is comparatively improved over other known heating arrangements used in GC systems.

The exterior surface of the outer cowl can be partially or fully covered with an insulator, made of a material suitable to provide ample thermal insulation. Illustratively, the insulator is made of a glass fabric material having a thickness of approximately 0.25 inches and can be provided as a cylinder or cone on the exterior of a cylindrical or conical cowl. Alternatively, the insulator can comprise other types of insulation including, but not limited to fiberglass, glass cloth, basalt, and the like. The material selected for the insulator generally needs to provide a sufficient thermal barrier between the column heating apparatus 200 and the ambient environment during a GC run.

The width of the flowpaths' space or gap formed between the cowls can be uniform along the height of one or both cowls, or it can be variable along such height(s). In some embodiments, the flow path tapers substantially continuously along the height of the inner shell. For example the gap can be narrowest at a first end and widest at a second end which is opposite the first end. In some embodiments where the inner and outer cowls are substantially conical, and the shells have a first end with a smaller diameter and a second end opposite the first end which has a larger diameter, the gap can be narrowest at the end having the smaller diameter and widest at the end having the larger diameter.

A GC column apparatus can include transfer lines that extend through the flowpaths between the cowls, in accordance with a representative embodiment. The transfer lines can provide a fluid connection between the GC column and a sample inlet or contaminant trap, and a detector or other flowpath components.

Two or more GC column heater apparatuses can be connected to a single cooling system by placing one heating unit on top of the other and fluidly connecting their flowpath (s). For example, the apparatuses can include two GC column units, each GC column unit includes a GC column between an inner cowl and an outer cowl. The cooling system includes a coolant source such as a fan or pressurized gas (e.g., carbon dioxide) which flows through flowpaths defined by the cowls and heater to contact and withdraw heat from the heaters of both GC column units. The cooling system is attached in a gas-tight connection to a first GC column unit, which is attached at its opposite end to a second GC column unit in a gas-tight connection. The GC column units have parts adapted for connection to a transfer line containing the sample to be analyzed.

It is also possible to arrange two columns on a single heater, one on the outer surface of the outer layer and one on the inner surface of the inner layer.

In view of this disclosure it is noted that the methods and apparatus can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

What is claimed is:

1. A heating apparatus for a gas chromatography (GC) column, comprising:
   a conical heater assembly comprising a heating element between an inner layer and an outer layer wherein the inner layer and the outer layer are conical, wherein the conical heater assembly is adapted for a GC column to move along the conical heater assembly in response to differing thermal expansions of the conical heater assembly and the GC column, and
   a cooling system, wherein the cooling system comprises a fan or pressurized gas, and the cooling system is configured to blow cooling gas over the conical heater assembly.

2. The apparatus of claim 1, wherein the conical heater assembly further comprises a first interior layer disposed between the heating element and the inner layer, or a second interior layer disposed between the heating element and the outer layer, or both a first interior layer disposed between the heating element and the inner layer, and a second interior layer disposed between the heating element and the outer layer.

3. The apparatus of claim 2, wherein the first interior layer and the second interior layer of the conical heater assembly form a unitary coating that encases the heating element.

4. The apparatus of claim 1, further comprising an outer cowl surrounding the outer layer of the conical heater assembly, wherein the outer cowl is arranged to provide a first flowpath between the outer layer of the conical heater assembly and the outer cowl.

5. The apparatus of claim 4, further comprising a cooling system, wherein the first flowpath between the outer cowl and the heater assembly is fluidly connected with the cooling system.

6. The apparatus of claim 1, further comprising an inner cowl that is surrounded by and arranged to provide a second flowpath between the inner layer of the conical heater assembly and the inner cowl.

7. The apparatus of claim 6, further comprising a cooling system, wherein the second flowpath between the inner cowl and the heater assembly is fluidly connected with the cooling system.

8. The apparatus of claim 1, wherein the outer layer of the conical heater assembly comprises one or more of metals, metal alloys, silicon, quartz, diamond, silicon carbide, boron nitride, aluminum nitride, or alumina.

9. A gas chromatography apparatus comprising a conical heater assembly comprising a heating element between an inner layer and an outer layer wherein the inner layer and the outer layer are conical and wherein the outer layer has an inner surface proximate to the heating element and an outer surface distal to the heating element and the inner layer has an outer surface proximate to the heating element and an inner surface distal to the heating element; and a gas chromatography (GC) column wound around the outer surface of the outer layer of the conical heater assembly, wherein the column is in contact with the outer layer of the heater assembly or a gas chromatography (GC) column wound on the inner surface of the inner layer of the conical heater assembly, wherein the column is in contact with the inner layer of the conical heater assembly, wherein the GC column and the conical heater assembly are adapted for the GC column to move along the conical heater assembly in response to differing thermal expansions of the conical heater assembly and the GC column.

10. The gas chromatography apparatus of claim 9, wherein the conical heater assembly is frustoconical.

11. The gas chromatography apparatus of claim 9, wherein the outer layer of the conical heater assembly comprises one or more of metal, metal alloys, silica, quartz, diamond, silicon carbide, boron nitride, aluminum nitride, or alumina, and the GC column comprises fused silica, glass, or metal.

12. The gas chromatography apparatus of claim 9, wherein the conical heater assembly has a cone angle $\theta$, and the conical heater assembly and the column are made from different materials, whereby a coefficient of friction $\mu$ exists for the different materials;

wherein the coefficient of friction and the cone angle are selected so that $N \sin(\theta/2)$ is greater than $(mg+T_y+\mu N \cos(\theta/2))$ when adding heat, where N is a normal force from conical heater assembly; $T_y$ is a vertical tensile force from the column; and mg is a gravitational force acting vertically on the column.

13. The gas chromatography apparatus of claim 12, wherein the apparatus has an operational temperature range, and $N \sin(\theta/2)$ is greater than $(mg+T_y+\mu N \cos(\theta/2))$ when adding heat throughout the temperature range.

14. The gas chromatography apparatus of claim 9, wherein the GC column has a length from about 1 m to about 105 m.

15. The gas chromatography apparatus of claim 9, wherein the conical heater assembly further comprises a first interior layer and a second interior layer, and the first and second interior layers form a unitary coating that encases the heating element.

16. The gas chromatography apparatus of claim 9, further comprising an outer cowl surrounding the outer layer of the conical heater assembly, and/or an inner cowl surrounding the inner layer of the conical heater assembly.

17. The gas chromatography apparatus of claim 9, further comprising a cooling system configured to blow cooling gas over the conical heater assembly.

* * * * *